(12) United States Patent
Lam

(10) Patent No.: US 10,402,444 B2
(45) Date of Patent: Sep. 3, 2019

(54) PERSONALIZED IMAGE-TEXT CREATION METHOD AND SYSTEM

(71) Applicant: Concept Infinity Limited, Hong Kong (HK)

(72) Inventor: Hiu Fung Lam, Hong Kong (HK)

(73) Assignee: Concept Infinity Limited, Hong Kong (HK)

( * ) Notice: Subject to any disclaimer, the term of this patent is extended or adjusted under 35 U.S.C. 154(b) by 443 days.

(21) Appl. No.: 14/964,566

(22) Filed: Dec. 9, 2015

(65) Prior Publication Data

US 2016/0171014 A1 Jun. 16, 2016

(30) Foreign Application Priority Data

Dec. 10, 2014 (HK) .................................... 14112448

(51) Int. Cl.
*G06F 16/58* (2019.01)
(52) U.S. Cl.
CPC .................................... *G06F 16/58* (2019.01)
(58) Field of Classification Search
CPC ............................................... G06F 17/30265
USPC ........................................ 707/722, 739, 769
See application file for complete search history.

(56) References Cited

U.S. PATENT DOCUMENTS

| 7,639,386 B1* | 12/2009 | Siegel | G06Q 10/10 358/1.18 |
| 8,117,564 B2* | 2/2012 | Woods | G06T 15/20 715/850 |
| 2007/0256011 A1* | 11/2007 | Jones | G06F 17/248 |
| 2014/0380237 A1* | 12/2014 | Kroupa | G06F 3/0483 715/803 |

FOREIGN PATENT DOCUMENTS

CN 102713872 A 10/2012

OTHER PUBLICATIONS

Search Report of Chinese Patent Office dated Feb. 13, 2015.

\* cited by examiner

*Primary Examiner* — Jean B Fleurantin

(57) ABSTRACT

A personalized image-text creation system and method is disclosed. The system including: a database that stores image-text data; a user interaction framework that interacts with a user equipment accessed to the creation system via a network; and a content aggregation engine that acquires corresponding image-text data from the database and generates a personalized image-text in response to interaction between the user interaction framework and the user equipment, according to the interaction. The present application provides a creation system and method that more flexibly and conveniently create personalized image-texts with more personalization and higher user experience.

19 Claims, 4 Drawing Sheets

PERSONALIZED IMAGE-TEXT CREATION METHOD AND SYSTEM

CROSS-REFERENCE TO RELATED APPLICATIONS

This application claims the benefit of Hong Kong Patent Application No. HK 14112448.7 filed on Dec. 10, 2014, the content of which is hereby incorporated by reference.

BACKGROUND

1. Technical Field

The present application relates to creation of personalized image-texts, and particularly, to a personalized image-text creation method and system.

2. Related Art

Personalized books, for example, personalized children's books created for children have already existed. Some children's books can include personalized text and/or graphics. In accordance with children data supplied by users, for example, names, skin tones, hair colors and other personal information, the children are written as characters in a certain story. However, the creation manner of the existing personalized books is relatively simple, the personalized customization manner is not flexible enough, and thus a more flexible solution is urgently needed.

SUMMARY

In an aspect, the present application is directed to a personalized image-text creation system, including: a database that stores image-text data; a user interaction framework that interacts with a user equipment accessed to the creation system via a network; and a content aggregation engine that acquires corresponding image-text data from the database, and generates a personalized image-text in response to the interaction between the user interaction framework and the user equipment, according to the interaction.

The content aggregation engine may acquire the corresponding image-text data from the database according to alphabets of a user name provided by the user equipment.

The content aggregation engine, according to each of the alphabets, may acquire a corresponding data classification belonging to each of the alphabets from the database respectively, and randomly acquire one or more image-text data from each data classification.

The content aggregation engine, according to each of the alphabets, may acquire a corresponding data classification belonging to each of the alphabets from the database, and may acquire one or more image-text data according to a keyword provided by the user equipment or according to a keyword in a user profile in the database from each data classification.

The image-text data may include non-variable framework data and variable detail data.

The framework data and the detail data may include image-text content data and image-text format data.

A same alphabet may correspond to different image-text content data or correspond to different image-text format data.

The image-text content data may include text, illustration, audio and video data; and the image-text format data may include image-text background and typographic layout data.

The illustration may be associated with the text, and when the illustration is re-customized, the associated text is updated automatically.

The personalized image-text may include a story ending hidden page, and the story ending hidden page is opened and displayed to a user after paid by the user.

The personalized image-text may include personalized story books, greeting cards, comic books, coloring books, 3D books, holographs, and customized image-texts on clothing or accessories.

Customization of the personalized image-text may be shared among multiple users.

The database may establish, for each image-text data, tags for indicating features of the image-text data.

The database may be an open database configured to allow an access of a partner.

The database may include a user database that stores a user profile.

The user profile may include user information, and the user information includes user personalization features, user education background, or user hobbies and interests.

The database may include a local database and a cloud database.

The user equipment may include a personal computer (PC), or a smart device. The PC may include a desktop computer or a laptop computer that runs a windows or OS X operating system. The smart device may include a smartphone or a tablet computer that runs an iOS system or an Android system.

In another aspect, there is also provided a personalized image-text creation method, including: providing a database that stores image-text data; providing a user interaction framework that interacts with a user equipment accessed to the creation system via a network; and according to interaction between the user interaction framework and the user equipment, acquiring, by a content aggregation engine, corresponding image-text data from the database, and generating a personalized image-text in response to the interaction.

The content aggregation engine may acquire the corresponding image-text data from the database according to alphabets of a user name provided by the user equipment.

DETAILED DESCRIPTION

A main objective of the present application is to provide a personalized image-text creation system and method. The personalization of an image-text refers to that a user can customize contents and formats of the image-text, so that the image-text can reflect personalized features of the user based on the user customization. The personalized image-text includes personalized story books, greeting cards, comic books, coloring books, 3D books, holographs, and customized image-texts on clothing or accessories, and so on. That is to say, the personalized image-texts can be loaded to various forms of image-text carriers. In addition, the image-text referred to herein not only refers to texts or graphics, but also includes various forms of data such as audio and video data. Hereinafter, the present application is described by taking customization of a personalized book as an example, and it can be understood that other forms of books can be created in a similar manner.

Figure 1:
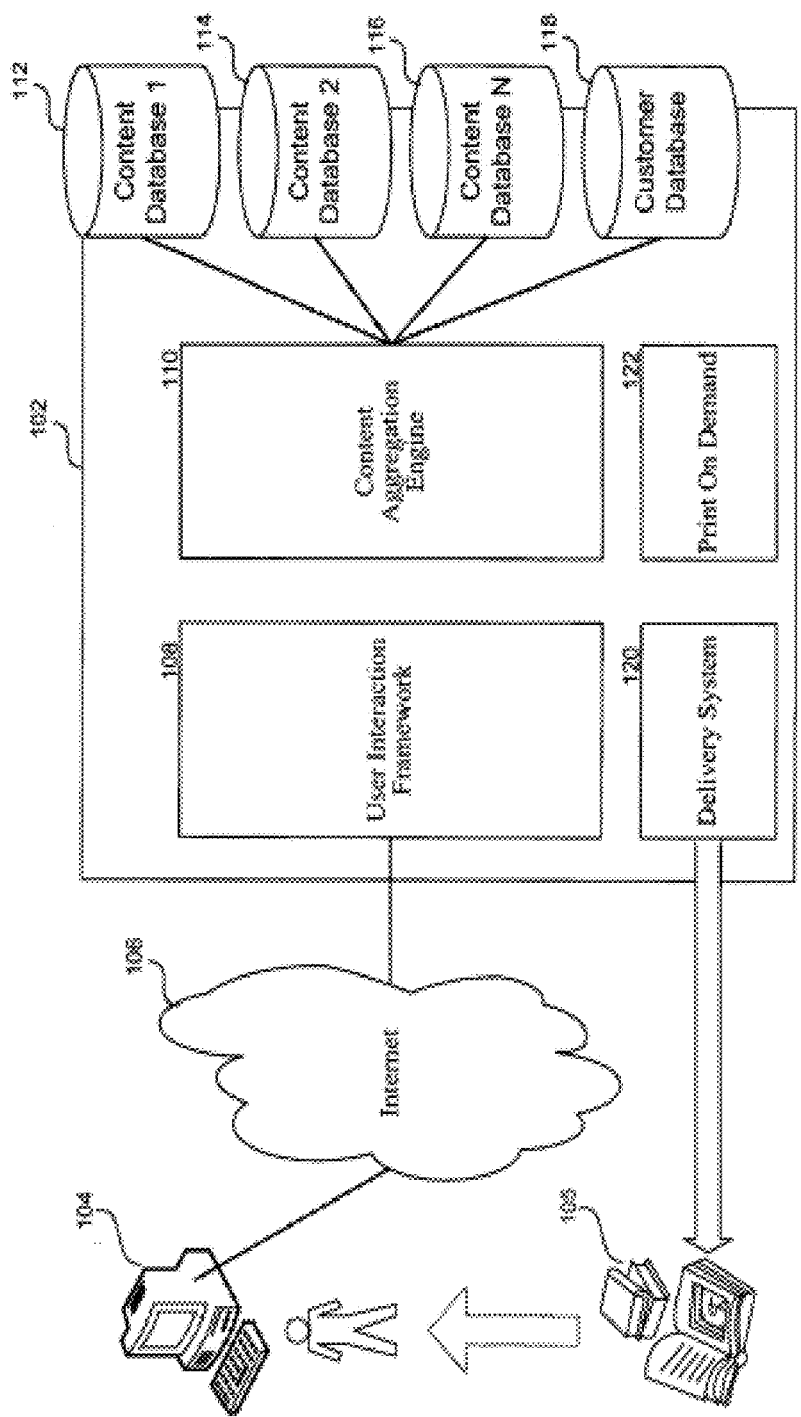
FIG. 1 is a process chart of personalized image-text content creation according to an embodiment of the present application.

Referring to FIG. 1, FIG. 1 is a process chart of personalized book creation. A user equipment 104 may be accessed to a personalized image-text creation system 102 via the Internet 106, and the creation system 102 makes a personalized book 105. The personalized image-text creation system 102 includes:

A user interaction framework 108 that interacts with the user equipment 104, which is similar to an interface of the user equipment.

A content aggregation engine 110, which is similar to a processing unit of the whole system, is connected with one or more databases, for example, content databases 112, 114 and 116 and a user database 118. A user profile may be stored in a user database, which includes user-related data, for example, user names, signs (such as gender, height, weight, skin tone and hair color), hobbies and interests, education experience and so on. The content database may include various personalized book content data, for example, various story plots, story endings and so on, content data may include text, picture, audio, video and other various forms of content data, and the content data may include variable data and non-variable data. The non-variable data may be some outline data pre-customized by the system in the content database, that is, personalized book framework data, and the variable data may be data of some specific plots and the like in a personalized book edited interacting with the user, that is, personalized book detail data.

The databases 112, 114 and 116 are generally implemented by mass storage devices. The mass storage devices, relative to a system server of the creation system 102, that is, the location of the content aggregation engine 110, may be at the cloud, that is, is not in the same place as the physical location of the system server, and the system server has access to the databases via the Internet, that is, the databases are cloud databases. The databases may also be local databases, that is, the location of the system server and the physical location of the mass storage devices are in the same place, and connections can be made through, for example, wired cables.

The user interaction framework 108 may provide a user interface, to support the user to customize variable texts and illustrations. The texts and illustrations may establish the correlativity, that is, the illustrations are associated with some texts, and when a certain illustration is re-customized, texts associated with the illustration may be updated automatically, to respond to changes of the illustrations. The variable texts and illustrations can be integrated to a user-customized personalized book, individually or in combination with non-variable texts and pictures, to form a complete story book.

The customized book is then converted to a print format, and can be sent to a printer 122 or a printing facility for printing, and afterwards, the personalized books 105 can be delivered to users via a delivery system 120.

Once contents of a personalized book are created, the user may also customize a format of the book. The user can, based on a template in software of the creation system, perform, for example, theme selection, theme color scheme, input user information and so on. A software program allows the user to save the information to one data file, for example, a user database 118, or the information may be printed to pre-printed pages. Thereafter, corresponding contents can be selected for insertion to the pre-printed pages. The user may also choose to generate one electronic book file, including user information, theme, background and other format data, the format data can form a software template, and the user can rapidly generate pre-printed pages based on the template and then supplement customized content data in the pre-printed pages. In addition, the system may set hidden pages, for example, endings can be set in the hidden pages, which are displayed to the users after confirmation or payment.

The personalized book may include texts and illustrations, a large number of pictures can be obtained from a list of particular pictures through a computing device, for example, a personal computer, a mobile device and a notebook (or laptop), and each picture may be associated with some comments. One picture is selected from the pictures through the computing device, the picture is arranged in the customized personalized pictures, and then comments associated therewith are arranged near the picture. For some groups that are inconvenient or have no ability to customize books, for example, children, a list of interview information can be provided through a third party and comments on particular interview information are collected from the children, so as to customize personalized children's books.

As stated previously, the creation system of the embodiment of the present application may include one or more content databases, each database may include multiple stories, wherein each story may include variable texts and illustrations, and non-variable texts and illustrations. The databases may further provide an interface accessible to the user, and the user can have access to the databases by means of the user equipment, and can edit the variable texts and illustrations.

The creation system 102 may interact with the user equipment 104 through the user interaction framework 108, the user interaction framework 108 provides a user interface to interact with the user, the user equipment 104 can select a particular story through the user interaction framework 108, loads particular texts and illustrations in the selected story, and the variable texts can be automatically updated based on the inserted pictures. Then, the customized story can be converted to a print-friendly format, and then can be sent to a printer for printing, and a printing facility for printing.

As stated previously, creation of the personalized book is merely exemplary, and the creation system not only can customize story books, but also can customize greeting cards, comic books, coloring books, 3D books, and holographs. Even, it can also customize contents on, for example, clothing, or accessories like wallets, and other similar products.

The personalized contents of the creation system may be customized based on a user name, and each alphabet in the user name may correspond to a particular content. For example, a story-alphabet mapping table is as Table 1:

TABLE 1

|     | A        | B        | ... | ... | Z        |
|-----|----------|----------|-----|-----|----------|
| 1   | $A_1$    | $B_1$    | ... | ... | $Z_1$    |
| 2   | $A_2$    | $B_2$    | ... | ... | $Z_2$    |
| ... | ...      | ...      | ... | ... | ...      |
| ... | ...      | ...      | ... | ... | ...      |
| Ns  | $A_{Ns}$ | $B_{Ns}$ | ... | ... | $Z_{Ns}$ |

Referring to Table 1, the content database of the creation system may store a large number of content data, during customization of one, for example, personalized story book, the large number of contents are taken as story materials of the personalized story book, according to a general story structure, the large number of story materials, that is, content data, can be stored in the database under categories, for example, story beginning, story middle, story ending and the like, and these are collectively called story contents. All the story contents can be mapped to different alphabets according to keywords of content data, for example, for a story content about adventure, its keyword may be defined as "adventure", and an initial alphabet thereof is taken, so as to map the story content about adventure to the alphabet A. Also, for a story about dream, its keyword may be defined as "dream", and an initial alphabet thereof is taken, so as to map the story about dream to the alphabet D. In this way, a large number of story contents can be mapped to 26 English alphabets, and it should be understood that Ns contents may be included under each English alphabet. It should be noted that Ns herein merely serves as a parameter of the number of contents, its number is not defined, and Ns may be a number from 0 to infinite, that is, content data is massive. That is to say, user names can be taken as indexes. Alphabets of a user name serve as a first-level alphabet index code, corresponding to 26 classes distinguished with 26 English alphabets, a random given number is taken as a second-level numerical index code, so as to be positioned to certain content data that takes a combination of "alphabet-number" as an index code. In addition, although Ns is used as a parameter of the number of content from A to Z in Table 1, it can be understood that values of Ns are not necessarily the same. That is, if corresponding to the alphabet A, Ns=10000. If corresponding to the alphabet B, Ns is not necessarily equal to 10000, which may be any value. Corresponding to the story beginning, middle and ending, there may be different mapping tables, that is, there may be a story beginning-alphabet mapping table, a story middle-alphabet mapping table, a story ending-alphabet mapping table similar to the structure of Table 1. When a story is divided into more parts, more such mapping tables may be included.

The user may takes his/her name as an index at first, and further, in multiple contents of each alphabet, acquisition can be performed, for example, in a random acquisition manner. For example, for a user whose name is "Alan Lam", contents that may be acquired according to the name are "A1 L8 A3 N9 L5 A6 M7". It can be seen that the alphabets therein are alphabets of the user name, and numbers behind the alphabets can be generated randomly, so as to, for example, obtain story contents whose index code is A1 in the mapping table according to the initial alphabet A of the user name, and obtain story contents whose index code is L8 in the mapping table according to the secondary alphabet L. Further, the story beginning, middle and ending can be determined according to alphabets of the user name, that is, for example, it is feasible to map the story beginning with the initial alphabet A of the user name, thus, a corresponding story beginning will be acquired in the story beginning-alphabet mapping table according to the initial alphabet A, a corresponding story middle can be acquired in the story middle-alphabet mapping table according to the middle alphabets L, A, N, L, A of the user name, and a corresponding story ending can be acquired in the story ending-alphabet mapping table according to the last alphabet M of the user name.

As stated previously, one alphabet may correspond to multiple different contents. Although acquired in massive data, the same contents may be acquired under random acquisition. For example, in the user name, although contents can be acquired in story beginning and story ending-alphabet mapping tables according to the initial alphabet A and the last alphabet M, corresponding to the middle alphabets L, A, N, L, A, as contents are acquired in the story middle-alphabet mapping table, the same contents may be acquired randomly for two identical alphabets, for example, L. The same applies to the two identical alphabets A. In the embodiment of the present application, it is set that the same alphabet appearing in the user name corresponds to different content data. As in the above example, the middle alphabets in the user name, i.e., the two identical alphabets L, will correspond to different content data, and the two identical alphabets A also correspond to different content data. In order to avoid repeated correspondence, for example, a method of exclusion can be used, for example, for the first alphabet L in the middle alphabets L, A, N, L, A, whether the alphabet L has appeared before it is determined at first, as the L appears for the first time, it is directly assigned randomly with a numerical index code, for example, number 8, so as to be positioned to content data whose index code is L8. The A and N thereafter may be processed in the same way. When the second L is used for indexing, according to query, it is determined that the alphabet L has appeared before, the number corresponding to the L appeared previously is further determined, that is, number 8, for the second L, after random acquisition is completed, whether the numerical index code randomly acquired is 8 is compared, if yes, re-acquisition is required, until the acquired numerical index code of the content is different from that of the previous L, so as to ensure that the two identical alphabets L correspond to different contents. Corresponding to the alphabet A thereafter, as it appears for the second time, its processing manner is similar to the second L. To avoid repeated correspondence, an average method may also be used, and numerical index codes of the same alphabet are averaged, to compare newly-acquired numerical index codes of the same alphabet with the average to compare repeated correspondence.

As stated previously, the same alphabet, in the embodiment of the present application, may correspond to different contents, for example, "Peter Lee" includes four identical E, although the four characters are the same alphabet, they can correspond to different contents. Further, the same alphabet not only may correspond to different contents, but also may correspond to different backgrounds, articles, characters, texts, story endings and so on. A correspondence table of users with the same name, for example, may be as Table 2 below:

TABLE 2

| Description | Peter Lee 1 | Peter Lee 2 |
|---|---|---|
| background | 2 | 3 |
| article | 4 | 5 |
| character | 5 | 4 |
| text | 5 | 4 |

TABLE 2-continued

| Description | Peter Lee 1 | Peter Lee 2 |
| --- | --- | --- |
| first name | P2e1t4e2r5 | P1e2t3e1r8 |
| surname | L4e3e8 | L1e6e7 |
| ending | 6 | 4 |
| others | | |

As in the table, it is feasible to establish an index for each image-text data, and to select image-text data based on a pre-customized mapping relationship. For example, numerical index numbers can be established for backgrounds, articles, characters and so on, and it is also feasible to provide each user with different format data through number selection or through keyword selection. On the other hand, it is feasible to establish a secondary mapping relationship that combines fixed and random manners according to 26 English alphabets, for example, first of all, in a content database corresponding to each English alphabet, from a category that takes the English alphabet as a primary index, for example, a user name is "Peter Lee", according to the first alphabet P of the name, it is feasible to correspond to content data that takes P as a primary index number, further, under the content data that takes P as a primary index number, it is feasible to include content data that takes numbers as a secondary index, for example, under the content data that takes "P" as an index number, 365 data is included, respectively numbered as 1-365, and it is feasible that a system randomly assigns one content data to the user based on a random rule. In the same way, contents associated with the name can be continuously created according to other alphabets in the user name alphabets of "Peter Lee". Thus, it can be seen from Table 1 that, although there are two users with the same name "Peter Lee", content data obtained according to the first name and the surname may be completely different. In this manner, at first, according to each of the alphabets, the content aggregation engine acquires a corresponding data classification belonging to each of the alphabets from the database respectively, and then randomly acquires one or more image-text data from each data classification belonging to the alphabets. In addition, the content aggregation engine may also acquire one or more image-text data according to a keyword provided by the user equipment or a keyword of a user profile in the database from each data classification belonging to the alphabets.

For example, the total number of pages of a customized story book includes the sum of the number of pages of contents of various parts, for example, the number of pages of story beginning+the number of pages of story middle+the number of pages of story ending+the number of pages of other elements. The other elements, for example, include cover, preface, back cover and so on. The creation system of the embodiment of the present application further includes design of controlling the total number of pages. That is, the total number of pages is pre-determined, and then pages of contents are adjusted according to the total number of pages. For example, for two users Alan Lam and Cinderella Leung, it can be seen that the number of alphabets of the user name of the user Alan is 7 and the number of alphabets of the user name of the user Cinderella is 15, and if the total number of pages is not controlled, the total number of pages of the story book customized by the user Cinderella may be far greater than that of the story book customized by the user Alan. To this end, in the creation system of the present application, the total number of pages is also controlled. For example, suppose the total number of pages is 100, wherein the number of pages of story beginning is 3, the number of pages of story ending is 5, the number of pages of other elements is 5, and the number of pages of story middle is 90; suppose each alphabet of the middle corresponds to 10 pages, the middle alphabets of the user Alan include 5 alphabets, i.e., l, a, n, l, a, and the number of pages of story middle is 50. The middle alphabets of the user Cinderella include the rest 13 alphabet except the initial alphabet C and the last alphabet G, and the number of pages of story middle is 130, which thus exceeds the predetermined number of pages of story middle (90). In this case, clipping design is performed, one clipping manner is capturing preceding 9 alphabets from 13 alphabets "inderella Leun", that is, "inderella", Or the surname of the user Cinderella may also be removed, that is, "Leung", and the name Cinderella is only used for content mapping, in this case, alphabets used to map the story ending are correspondingly changed as the last alphabet A of the name Cinderella.

Figure 2:
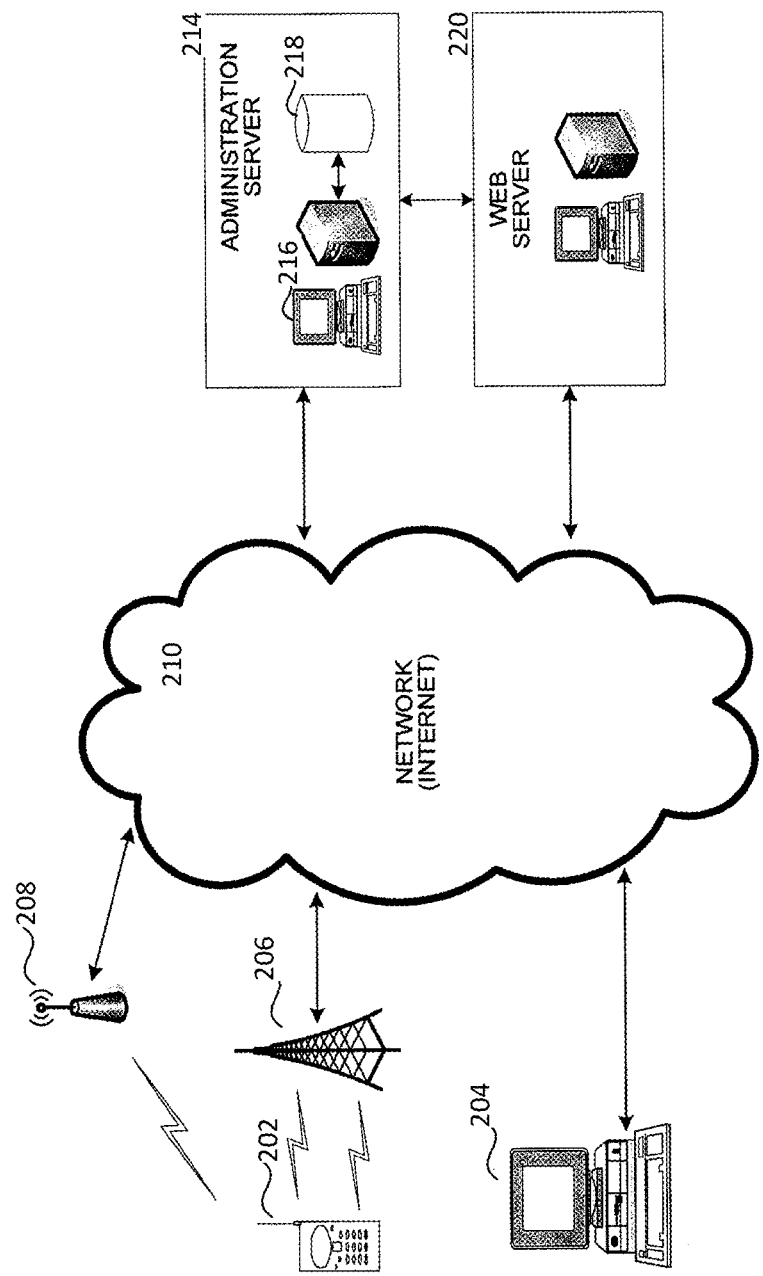
FIG. 2 is an architectural view of a personalized image-text creation system according to an embodiment of the present application.

Referring to FIG. 2, the user can use a mobile device 202, through a base station 206 or a wireless router 208, to have access to the network (Internet) 210, may also be, through, for example, a desktop computer 204, accessed to the network 210, and then through the network 210, can be accessed to a web server 220, or accessed to an administration server 214. The administration server 214 includes a server device 216 and a database 218.

Figure 3:
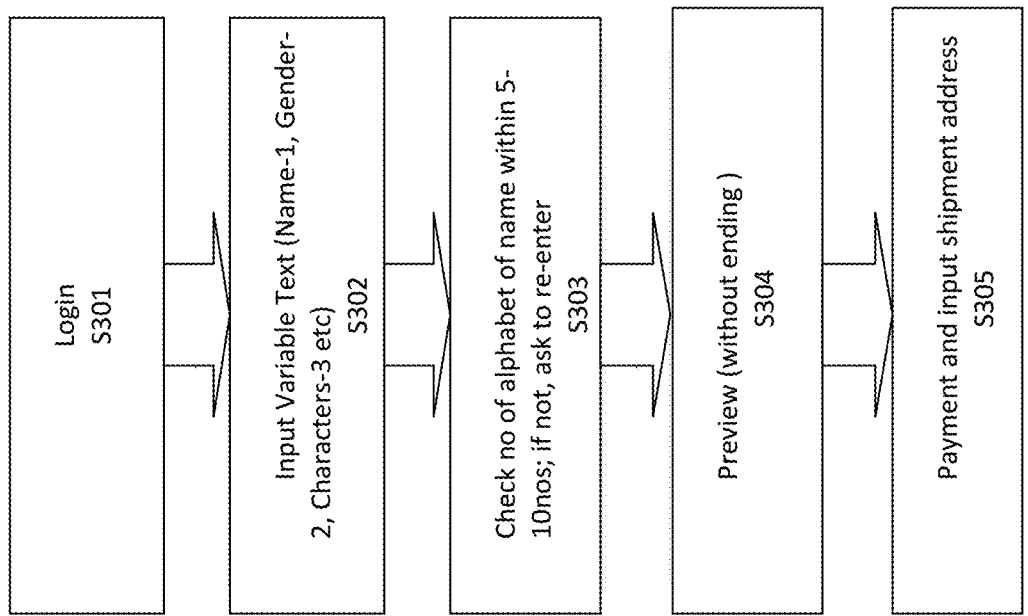
FIG. 3 is a flow chart of personalized image-text creation according to an embodiment of the present application.

Referring to FIG. 3, in step S301, the user uses his user equipment, for example, a desktop computer, to be connected to the Internet, log in to a website of a creation system, and can log in to a content database from a login web of the website.

In step S302, once the user logs in successfully, the login web is converted to a customized web, to allow the user to select a story from a customizable story library. The user can, after browsing the stories, select one story, and non-variable texts and illustrations can be provided according to the user selection, which represents a basic outline of a story or a theme. The user can edit variable texts and illustrations on this basis. Customized tutorial may also be provided, to teach the user how to make personalized book customization. The variable texts may include name, age, or description information of one character, and may be user-customized. The variable illustrations include colors, shapes and features associated with one character or object, and may also include background and environment of the character or object.

In step S303, the system may check the number of alphabets of the name, once the number of alphabets does not conform to requirements, for example, the number exceeds a predetermined range of 5-10, the user is required to re-input. When the number conforms to requirements, the user's edition is accepted. The number of alphabets of the name is controlled, and the total number of pages of the customized book can be controlled. As stated previously, it can be controlled through the subsequent clipping design. Similarly, it is also feasible to directly control the number of alphabets of the name input by the user in this step. Thus, the clipping design can be omitted, but user-defined flexibility is lost to a certain extent. It should be understood that controlling the total number of pages is not necessary, which may be selected by the user.

In step S304, once the user completes edition, page previewing of the personalized book can be performed. A previewing page displays effects of a book to be printed according to format and content edited by the user. The previewing page may hide some pages, for example, story ending or particular plot parts, which may require the user to perform page purchasing.

In step S305, after the user makes a payment, the hidden pages are further provided, and can be delivered by, for example, the delivery system 120 shown in FIG. 1 according to a shipment address input by the user, to provide the personalized book 105 for the user.

According to the creation system of the embodiment of the present application, it is feasible that a user A customizes a book for another user B, and the user A establishes a user profile of the user B. The user A, for example, is a parent, and the user B, for example, is a child. For another example, the user A may perform customization for a friend selected. The user A may establish a user profile on the creation system according to features of his/her own child, for example, gender, height, weight, skin tone, hair color, eye color, hobbies and interests and other various personalized features, and then can perform content customization according to the profile.

In addition, multiple users can provide sharing of a customized book, after a parent customizes a book for a child, the book can be shared to the child's user equipment, the child can preview the book and re-edit the customized book according to his/her own preference, and finally, the shared users complete customization of the personalized book after confirmation.

Figure 4:
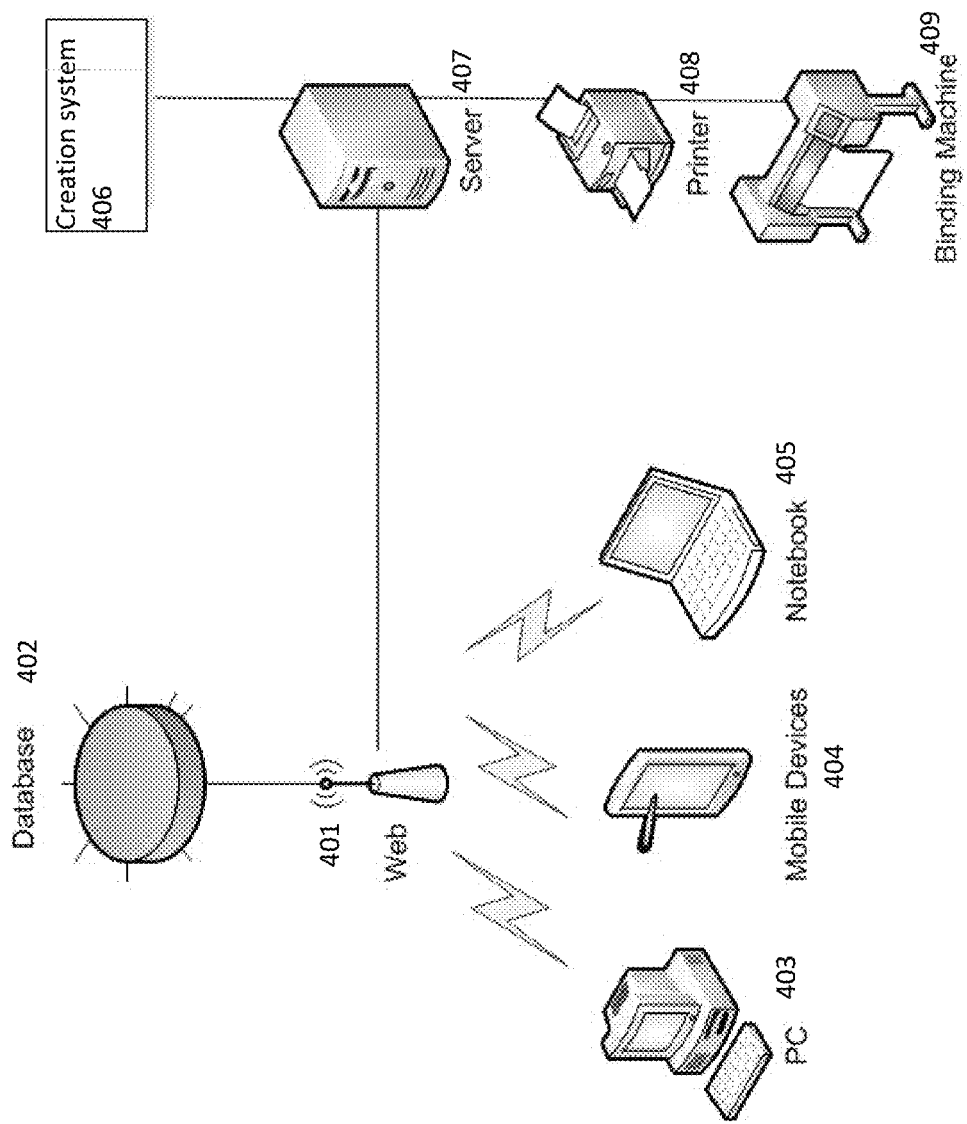
FIG. 4 is a structural connection view of a personalized image-text creation system according to an embodiment of the present application.

Referring to FIG. 4, the administration server 407 can run a personalized book content creation program of the embodiment of the present application, a user equipment, for example, a desktop computer 403, a mobile device 404, for example, a smartphone 404, a notebook 405 and the like can be accessed to a web server 401, the web server 401 can maintain setting of a database 402, the database 402 can include, non-variable texts and illustrations that serve as, for example, a story theme, and can also provide various templates about book format, for example, layout and typesetting, text and illustration background and the like, and the database may further provide a template of variable texts and illustrations, to allow the user to rapidly customize texts and illustrations. By loading the administration server 407 with the creation system 406, creation of the personalized book can be completed, and creation of the personalized book is completed via printing of a printer 408 and binding of a binding machine 409.

In order to help the user to rapidly create contents, it is also feasible to create content data according to a user instruction, for example, when the user has established a user profile in a user database, a content database can retrieve whether the user database has the corresponding user profile according to the user name of the user, once the user profile is found, it is feasible to, according to user information therein, for example, personal features of the user, such as gender, height, weight, skin tone, hair color or education background and personal hobbies and interests, take the user information as keywords to retrieve content data associated with the keywords in the content data, which is displayed to the user to allow the user to make a further selection. Alternatively, it is also feasible that the user inputs search keywords during customization, and in response to the keywords, contents associated with the keywords are selected from the content database and provided to the users.

Generally, during customization, customization of non-variable contents is performed at first, and once related non-variable contents are obtained according to, for example, a user name, the user can edit variable texts and illustrations on this basis. Similarly, in order to help the user to rapidly create contents, it is feasible to provide data of a template of the variable texts and illustrations, according to the user's input, once the user inputs a certain keyword, some template data containing such a keyword can be provided according to the keyword, to allow the user to edit on the basis of the template data, so that the speed at which the user edits the variable texts and illustrates can be increased significantly. The content database can establish tags according to contents of each content data, and the tags can help classification of the content data; on the other hand, the tags can also facilitate the user to retrieve the content data. The tags can also be used to provide other indications for the content data, for example, whether to customize a text, a picture, a customized title, or customize one or more attributes and the like. The content data is not limited to texts and illustrations, and may further include audio, video and other forms of content data. The content data may be selected from a web, audio, video and photos. The content database may be an open database, which can be provided through multiple content partners, for example, may cooperate with various media, magazines and books, contents of the media, magazines and books all can serve as contents of the content database, for example, it is also feasible that a network operator serves as a partner, for example, Wikipedia and some cooperative forums, and the contents therein all can serve as contents in the content database.

Steps of the personalized image-text creation method of the embodiment of the present application include:

providing a database used for storing image-text data;

providing a user interaction framework used for interacting with a user equipment accessed to the creation system via a network; and according to interaction between the user interaction framework and the user equipment, acquiring, by a content aggregation engine, corresponding image-text data from the database, and generating a personalized image-text in response to interaction with the user equipment.

The process of interaction between the user and the system includes:

1. the user provides personal information about the user;

2. the system provides personalized book framework data (non-variable data) according to the user information, and in response to user customization, provides personalized book detail data (variable data);

3. the system updates the personalized book detail data in response to user input; and 4. the system integrates the personalized book framework data and detail data to generate a personalized book.

In this way, the user can customize a book extremely personalized, the user can create a personalized feature into the personalized book, so that a story character like the personalized feature customized by the user will appear in the personalized book, which can accept education according to education background customized by the user, grow according to growing experience customized by the user, go through various stories in plots customized by the user, and finally go through the story ending customized by the user. This makes the user have higher experience, it seems that the user lives, grows and adventures in the story's world, and the user's empathy is deeper. Due to openness of the database of the creation system, it has massive content data, can accept an infinite amount of user customization, the user can create a short story and can also create a long novel, and massive data resources can provide the user with an infinite amount of story materials to support the user to create the personalized book at any length. Similarly, under such massive data resources, the ending of one story can be infinite, the user can select a fixed story ending in one story, and can also design an open story ending, and even the user can design multiple story endings and multiple routes achieving a particular ending, that is, the user's selection of each particular stage in the story process can cause the story to be pointed to a certain particular story ending.

The above description is merely intended for explanation; however, for those skilled in the art, it is apparent that some particular details are not necessary during practice of the present application. Therefore, the above description of the embodiments is merely intended for description and explanation, instead of enumerating or limiting the present application; evidently, many modifications and changes are allowable based on the teaching. The embodiments are merely selected to explain the principle and actual applications of the present application, so that those skilled in the art can better use the present application and make various modifications suitable for expected particular uses based on the embodiments.

What is claimed is:

1. A personalized image-text creation system, comprising:
    a database that stores image-text data, each of said image-text data being a story-based content or a part thereof;
    a user interaction framework that interacts with a user equipment accessed to the creation system via a network, wherein the user interaction platform receives a string of alphabets from the user equipment; and
    a content aggregation engine that forms part of an administration server, wherein the content aggregation engine is configured to:
        assign a numerical value to each of the plurality of alphabets contained in the string of alphabets in order to generate a set of index codes;
        check whether one or more same alphabets assigned with a same numerical value is present in the set of index codes;
        modify, in order to generate a set of unique index codes, the numerical values corresponding to the one or more same alphabets until different numerical values gets assigned to the one or more same alphabets; and
    acquire and map each of the unique index code of the set of the unique index codes with corresponding image-text data from the database so as to generate, in real-time, a personalized image-text in response to the interaction between the user interaction framework and the user equipment, wherein each of the unique index codes of the set of the unique index codes corresponds to different image-text data, and wherein the interaction between the user interaction framework and the user equipment generates at least part of a user profile.

2. The creation system according to claim 1, wherein the content aggregation engine acquires the corresponding image-text data from the database according to the one or more alphabets of the users' name provided by the user equipment.

3. The creation system according to claim 2, wherein the content aggregation engine, according to each of the alphabets, acquires a corresponding data classification belonging to each of the alphabets from the database respectively, and randomly acquires one or more image-text data from each data classification.

4. The creation system according to claim 3, wherein the image-text data comprises non-variable framework data and variable detail data.

5. The creation system according to claim 4, wherein the framework data and the detail data comprise image-text content data and image-text format data.

6. The creation system according to claim 1, wherein the image-text content data comprises text, illustration, audio and video data; and the image-text format data comprises image-text background and typographic layout data.

7. The creation system according to claim 6, wherein the illustration is associated with the text, and when the illustration is re-customized, the associated text is updated automatically.

8. The creation system according to claim 7, wherein the personalized image-text comprises a story ending hidden page, and the story ending hidden page is opened and displayed to a user after paid by the user.

9. The creation system according to claim 2, wherein the content aggregation engine, according to each of the alphabets, acquires a corresponding data classification belonging to each of the alphabets from the database, and acquires one or more image-text data according to a keyword provided by the user equipment or according to a keyword in a user profile in the database from each data classification.

10. The creation system according to claim 1, wherein the personalized image-text comprises personalized story books, greeting cards, comic books, coloring books, 3D books, holographs, and customized image-texts on clothing or accessories.

11. The creation system according to claim 1, wherein customization of the personalized image-text is shared among multiple users.

12. The creation system according to claim 1, wherein the database establishes, for each image-text data, tags for indicating features of the image-text data.

13. The creation system according to claim 1, wherein the database is an open database configured to allow an access of a partner.

14. The creation system according to claim 1, wherein the database comprises a user database that stores a user profile.

15. The creation system according to claim 14, wherein the user profile comprises user information, and the user information comprises user personalization features, user education background, or user hobbies and interests.

16. The creation system according to claim 1, wherein the database comprises a local database and a cloud database.

17. The creation system according to claim 1, wherein the user equipment comprises a personal computer (PC), or a smart device; the PC comprises a desktop computer or a laptop computer that runs a windows or OS X operating system; and the smart device comprises a smartphone or a tablet computer that runs an iOS system or an Android system.

18. A method for generation of personalized image-text, said method comprising:
    providing a database that stores image-text data;
    providing, at a user equipment, a user interaction framework that interacts with a content aggregation engine via a network, wherein the user interaction platform receives a string of alphabets from the user equipment;
    assigning, via a content aggregation engine, a numerical value to each of the plurality of alphabets contained in the string of alphabets in order to generate a set of index codes;
    checking, via the content aggregation engine, whether one or more same alphabets assigned with a same numerical value is present in the set of index codes;
    modifying, via the content aggregation engine, in order to generate a set of unique index codes, the numerical values corresponding to the one or more same alphabets until different numerical values gets assigned to the one or more same alphabets; and acquiring and mapping, based on interaction between the user interaction framework and the user equipment, via the content aggregation engine that is configured in a server, each of the unique index code of the set of the unique index codes with corresponding image-text data from the database, and generating, in a real time, the personalized image-text in response to the interaction, wherein each of the unique index codes of the set of the unique index codes corresponds to different image-text data, and wherein the interaction between the user interaction framework and the user equipment generates at least part of a user profile.

19. The creation method according to claim 18, wherein the content aggregation engine acquires the corresponding image-text data from the database according to alphabets of a user name provided by the user equipment.

* * * * *